(12) United States Patent
Baker et al.

(10) Patent No.: US 9,449,337 B2
(45) Date of Patent: Sep. 20, 2016

(54) EMULATION OF A CLIENT BROWSER AND GENERATION OF WEB PAGE DATA BY AN ELECTRONIC COMMERCE SERVER IN A TESTING ENVIRONMENT HAVING A SEPARATE TEST SERVER

(75) Inventors: David Michael Baker, North Delta (CA); Simon Droscher, Vancouver (CA); Derek Alan Lewis, Vancouver (CA); Jon Call Ferguson, Coquitlam (CA)

(73) Assignee: Elastic Path Software, Inc., Vancouver (CA)

( * ) Notice: Subject to any disclaimer, the term of this patent is extended or adjusted under 35 U.S.C. 154(b) by 455 days.

(21) Appl. No.: 13/052,037

(22) Filed: Mar. 18, 2011

(65) Prior Publication Data

US 2012/0239537 A1 Sep. 20, 2012

(51) Int. Cl.
*G06F 17/00* (2006.01)
*G06Q 30/06* (2012.01)
*G06F 11/36* (2006.01)
*G06Q 30/02* (2012.01)
*G06F 17/22* (2006.01)

(52) U.S. Cl.
CPC ........... *G06Q 30/06* (2013.01); *G06F 11/3668* (2013.01); *G06Q 30/02* (2013.01); *G06F 17/2247* (2013.01)

(58) Field of Classification Search
CPC ............... G06Q 30/0247; G06Q 30/0243; G06Q 30/0244; G06Q 30/0269; G06Q 30/0261; G06Q 30/0253; G06Q 30/0277; G06Q 30/02; G06Q 30/06; H04L 67/22; H04L 67/02; H04L 43/04; G06F 17/30899; G06F 11/3672; G06F 17/30905; G06F 17/30807; G06F 17/2247; G06F 11/3668

USPC ....... 715/200, 201–202, 205, 209, 234, 267, 715/271, 276–277; 717/110, 124, 126, 131; 705/14.49, 14.51, 14.58; 709/203, 709/223–224

See application file for complete search history.

(56) References Cited

U.S. PATENT DOCUMENTS

| | | | |
|---|---|---|---|
| 7,334,220 B2 * | 2/2008 | Chang et al. ................. | 717/126 |
| 7,831,658 B2 * | 11/2010 | Khopkar et al. ............. | 709/203 |
| 7,844,894 B2 * | 11/2010 | Khopkar et al. ............. | 715/234 |
| 7,975,000 B2 * | 7/2011 | Dixon et al. ................. | 709/203 |

(Continued)

OTHER PUBLICATIONS

Kohavi, R. et al.,"Controlled experiments on the web: survey and practical guide," © 2008, Springer, in Data Min Knowl Disc (2009) 18 pp. 140-181.*

*Primary Examiner* — Cesar Paula
*Assistant Examiner* — James H Blackwell
(74) *Attorney, Agent, or Firm* — Alleman Hall McCoy Russell & Tuttle LLP (57) ABSTRACT

A method for electronic commerce management is provided. The method includes sending a request to the test server to be assigned a session identifier, the session identifier being associated with an assigned content version and receive the session identifier from the test server. The method further includes generating web page data to send to the client program, the web page data including (1) computer code which upon execution will cause the client program to retrieve the assigned content version of the static content from the test server using the session identifier, and (2) dynamic web page content based on one or more dynamic content factors and send the web page data to the client program.

15 Claims, 4 Drawing Sheets

(56) References Cited

U.S. PATENT DOCUMENTS

| | | | |
|---|---|---|---|
| 8,140,376 B2* | 3/2012 | Koonce et al. | 705/7.29 |
| 8,160,909 B2* | 4/2012 | Voda et al. | 705/7.11 |
| 8,239,489 B1* | 8/2012 | Vasilik | 709/218 |
| 8,296,643 B1* | 10/2012 | Vasilik | 715/200 |
| 2002/0112133 A1* | 8/2002 | Gagne et al. | 711/150 |
| 2002/0174182 A1* | 11/2002 | Wilkinson et al. | 709/205 |
| 2006/0271671 A1* | 11/2006 | Hansen | 709/224 |
| 2007/0130090 A1* | 6/2007 | Staib et al. | 705/400 |
| 2007/0271392 A1* | 11/2007 | Khopkar et al. | 709/245 |
| 2008/0091517 A1* | 4/2008 | Koonce et al. | 705/10 |
| 2008/0189156 A1* | 8/2008 | Voda et al. | 705/7 |
| 2008/0275980 A1* | 11/2008 | Hansen | 709/224 |
| 2009/0282343 A1* | 11/2009 | Catlin | G06F 17/30867 715/738 |
| 2010/0138813 A1* | 6/2010 | Kim et al. | 717/131 |
| 2010/0313183 A1* | 12/2010 | Ellen et al. | 717/110 |
| 2011/0035379 A1* | 2/2011 | Chen et al. | 707/740 |
| 2011/0161825 A1* | 6/2011 | Tierney et al. | 715/736 |

* cited by examiner

EMULATION OF A CLIENT BROWSER AND GENERATION OF WEB PAGE DATA BY AN ELECTRONIC COMMERCE SERVER IN A TESTING ENVIRONMENT HAVING A SEPARATE TEST SERVER

BACKGROUND

Electronic commerce websites are continually being refined to retain users on the website and entice the user to purchase items, services, or take other actions that will result in an increase in the website's revenue. A variety of statistical tools have been developed to test graphical aspects of a web page to determine the type and layout of graphical content on a web page that may be most effective at inducing a purchase or other desired action. For example, split testing may be used to test two versions of a web page or multi-variate testing may be used to test a multitude of content variations in a web page.

However, prior split testing systems suffer from the drawback that the type of content that they can test is limited to static content, which is content that remains unchanged when presented on to users in a variety of different computing sessions. In contrast, dynamic content, which is content that is programmatically determined by the website servers and thus may vary based on user browsing history, state, etc., cannot be tested. The inability to apply such split testing methodologies to dynamic website content prevents website owners from more fully understanding the behavior of their customers and the effectiveness of their website.

SUMMARY

A method for electronic commerce management is provided. The method includes receiving a request from a client program for web page data featuring a product for sale at the electronic commerce server. The method further includes sending a request to the test server to be assigned a session identifier, and receiving the session identifier from the test server. The session identifier is associated with an assigned content version that is one of a plurality of content versions associated with a variant testing model implemented by the test server. In this way, the electronic commerce server may masquerade as a client program to receive a session identifier. The method further includes generating web page data to send to the client program, the web page data including (1) computer code which upon execution will cause the client program to retrieve the assigned content version of the static content from the test server using the session identifier, and (2) dynamic web page content based on one or more dynamic content factors and send the web page data to the client program.

The method may further include sending a request for an assigned content version identifier to the test server and receiving the assigned content version identifier from the test server. Additionally, the dynamic content factors may include the assigned content version identifier, enabling the assigned content version to be used to alter dynamic web page content. In this way, dynamic content may be modified by the electronic commerce server and used as a variant in a test performed via the test server. As a result dynamic web page content may be used as a variant in a marketing test, expanding the type of content that may be tested via the test server.

In some embodiments the method may further include receiving a request from the client program for a purchase transaction for the product at the electronic commerce server and sending a message from the electronic commerce server to the test server reporting the session identifier and the completion of the purchase transaction. Reporting completion of purchase transaction to the test server allows the effectiveness of the assigned content version to be gauged.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A system and method for enabling marketing testing of dynamic content on a web page is disclosed herein. Specifically, the system and method enables an electronic commerce server to masquerade as a browser program to open up a testing session with a test server to obtain session and content version identifiers. The electronic commerce server may then use the session and content version identifiers to modify dynamic web page content slated to be provided to a browser program executed on a client device. In this way, dynamic content provided on a web page may be varied for marketing testing purposes. As a result the types of content which may be tested through for example a split test and/or multi-variate test via a test platform may be expanded. Furthermore, the system and method can be used with existing testing platform such as ADOBE® TEST AND TARGET or other common web page testing platforms, thereby increasing the systems applicability and market appeal.

Figure 1:
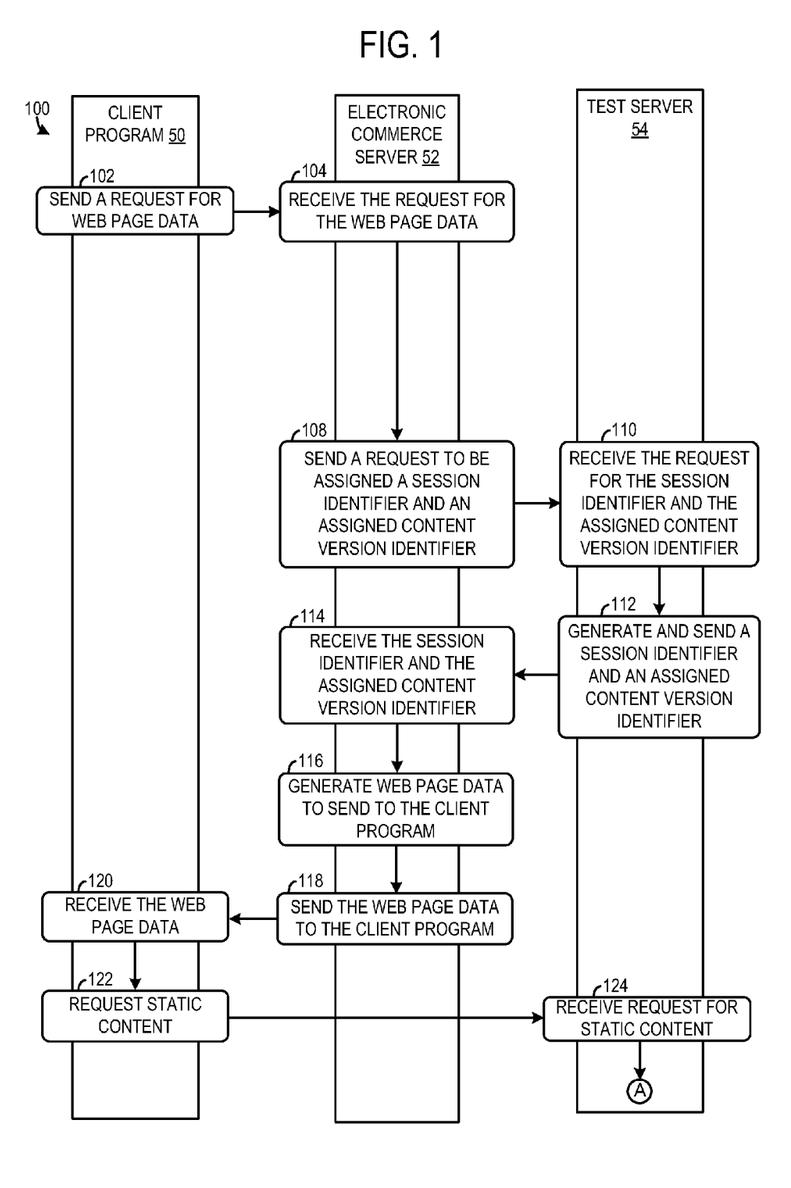
FIGS. 1 and 2 show a method for management of an electronic commerce system including a client program, an electronic commerce server, and a test server.
Figure 2:
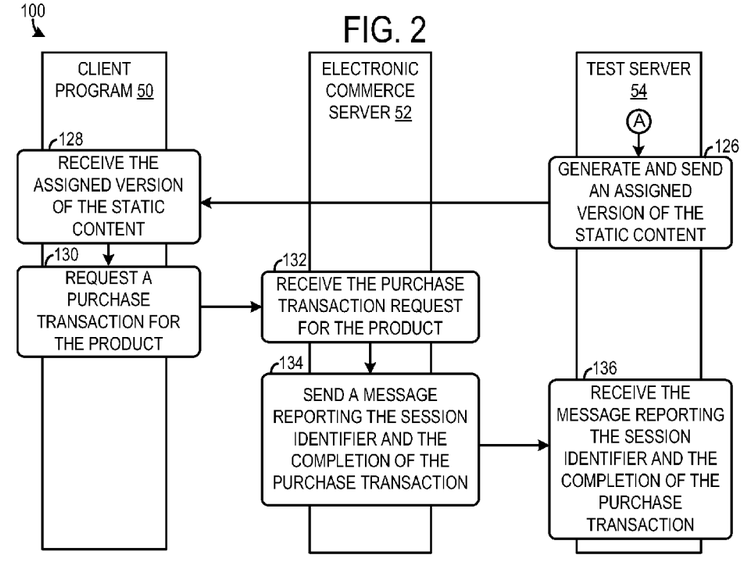

FIGS. 1 and 2 show an example method 100 for electronic commerce management. As shown the method may be implemented via a client program 50, an electronic commerce server 52, and a test server 54. The client program 50 may executed via a client device 602 described in greater detail herein with regard to FIG. 6.

Figure 3:
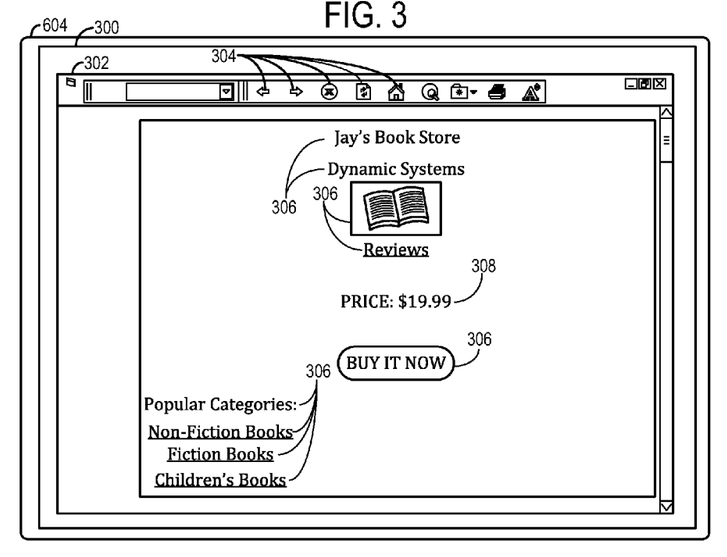
FIGS. 3-5 show exemplary graphical user interfaces (GUIs) presented on a display of a client device executing the client program shown in FIGS. 1 and 2.
Figure 6:
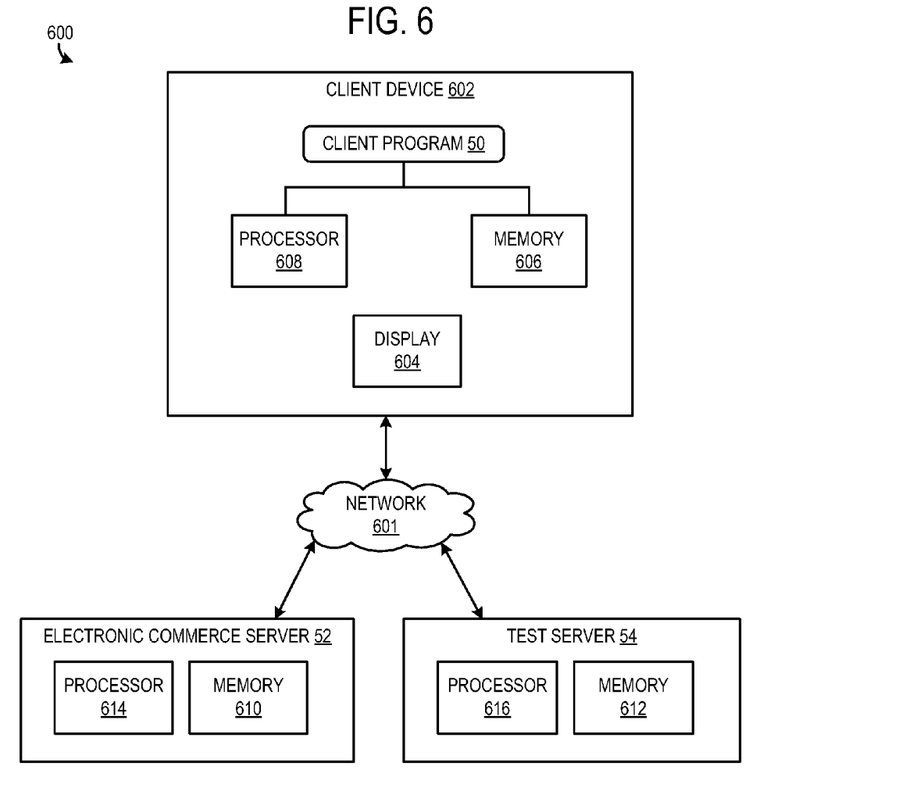
FIG. 6 shows a schematic diagram of a system for electronic commerce management including the electronic commerce server and the test server shown in FIG. 1 as well as a client device.

FIG. 3 shows an example graphical user interface (GUI) 300 presented on a display 604 of client device 602, shown in FIG. 6, that may be generated via the client program 50 (e.g., web-browser). FIG. 3 shows graphical content that may be presented in response to actions performed in method 100. Therefore, method 100 and FIG. 3 are jointly described. As shown a browser window 302 presented in the GUI 300 includes various tools 304 providing navigation in a network such as the Internet as well as other functionalities. The functions of the tools may include but are not limited to navigation to a home page, both forward and backward navigation through web pages, refreshing of a web page, searching, etc.

Returning to FIG. 1, at 102 the method includes sending a request for web page data from the client program 50 to the electronic commerce server 52. The web page data may include data featuring a product for sale on a web page such as text, graphical data, objects, audio data, video data, etc., informing a client of various aspects of the product. It will be appreciated that additional web page data may be requested by the client program which may include but is not limited to links, advertising content, etc. It will be appreciated that the web page may be included in a website hosted or otherwise supported via the electronic commerce server 52.

At 104 method 100 includes receiving the request from the client program for web page data featuring a product for sale at the electronic commerce server 52. The web page data may include static content that is subject to variant testing. The static content may be one of a plurality of content versions associated with a variant testing model implemented by the test server. The static content may include text, images, objects, videos, animations, HTML, audio content, and cascading style sheets. Exemplary static content 306 is presented on the GUI 300 shown in FIG. 3.

At 108 the method further includes sending a request to the test server to be assigned a session identifier and an assigned content version identifier. The session identifier enables the electronic commerce server 52 and the client program 50 to repeatedly access a particular session generated by the test server 54. The session identifier may be a suitable identifier such as an alpha-numeric code, and is used by the test server to identify and track a particular user session between the test server and a user's browser. In this way, the electronic commerce server masquerades as a browser program to obtain a session identifier. Furthermore, the session identifier may be associated with an assigned content version corresponding to a variant test performed by the test server. One way in which this association may be made is by associating the session identifier for each user with an assigned content version identifier, which may be requested and received in the same request, as illustrated at 108, or in a different request. Typically, the session identifier and assigned content version identifier are requested and received a first time a user browses web pages served by the electronic commerce server 52, and the data may be stored in a cookie set by the client program 50. In this manner, the session identifier and assigned content version identifier may be referenced as the user browses all pages of the electronic commerce server during that browsing session, so that static and dynamic content may be adjusted across these different web pages in a programmatic manner by the electronic commerce server 52 and the test sever 54.

The assigned content version identifier may be associated with a particular test such as a multi-variate or a split test. Therefore, each test may include at least two content versions, (e.g., A|B), and the assigned content version identifier may indicate the content version, (e.g., by indicating A or B). The performance of the different content versions may be compared via the test server. The performance may be measured in terms of conversions. A conversion as described herein typically refers to a user purchasing an item, but in other examples may also include a different desired action that is performed by the user of the client program, such as providing information, navigating to another web page, etc. In this way, comparison testing of a web page may be implemented. It will be appreciated the aforementioned statistical test is exemplary in nature and numerous suitable test may be performed via the test server using assigned content versions. In other embodiments the assigned content version identifier may be appended with the session identifier. In other words, the session identifier and assigned content version identifier may be bundled together and sent as a unified message.

At 110 method 100 includes receiving the request for the session identifier and the assigned content version identifier sent from the electronic commerce server 52 at the test server 54. Next at 112 the method includes generating and sending a session identifier from the test server to the electronic commerce server. At 114 method 100 includes receiving the session identifier and the assigned content version identifier from the test server 54 at the electronic commerce server 52.

At 116 the method includes generating web page data to send to the client program. The web page data may include computer code which upon execution will cause the client program to retrieve the assigned content version of the static content from the test server using the session identifier. In this way, the web page data provided to the client program includes links to content provided by the test server. In some embodiments the computer code may be runtime executable code that is executed in a runtime environment provided by a plug in of the client program. For example, the computer code may be JAVASCRIPT®, etc. Furthermore, the computer code may further instruct the client program to store the session identifier in a cookie on the client device executing the client program 50 in some embodiments.

The web page data sent to the client program 50 may further include dynamic web page content that is generated by the electronic commerce server based on one or more dynamic content factors. The dynamic web page content may include pricing data and/or item shipping data, for example. In addition, the dynamic web page content may include graphical and layout content, such as cascading style sheets, images, borders, backgrounds, etc., as well as other types of data. FIG. 3 shows exemplary dynamic content 308 presented on the GUI 300. Moreover, the dynamic content factors may include the assigned content version identifier. In this way, the dynamic content may be programmatically determined by the electronic commerce server based on which content version is being presented to the user by the test server. This would enable, for example, pricing and shipping promotions to be adjusted by the electronic commerce server based on the content version (e.g., A|B) being tested by the test server. That is, a dynamic pricing/shipping algorithm could determine price/shipping promotions based on a variety of factors including the content version. Further, dynamic web page content such as pricing and shipping data may be used as a variant in a test performed via the test server such as a split test or a multi-variate test. Additionally, the dynamic content factors may include a location of the client device and a browsing history of the client program. For example, a user who has previously purchased items on a particular website via the client program may receive a discount on future purchases while a new user who has not previously purchased items on the website before may not receive any discounts.

Continuing with FIG. 1, at 118 the method includes sending the web page data to the client program 50 from the electronic commerce server 52. At 120 the method includes receiving the web page data from the electronic commerce server via the client program.

Next, at 122 method 100 includes requesting static content from the test server via the client program 50. It will be appreciated that the request for static content may be embedded in web page data, as previously discussed. At 124 the method includes receiving the request for the static content from the client program 50 at the test server 54. Moving to 126 of FIG. 2, the method includes generating and sending an assigned version of the static content to the client program from the test server. It will be appreciated that generating an assigned version of the static content may include retrieval of the assigned version of the static content with a database included in the test server. At 128 the method includes receiving the assigned version of the static content from the test server at the client program. In this way, the user of the client program may view the assigned version of the tested static content.

Next at 130 the method includes requesting a purchase transaction for the product from the electronic commerce server via the client program. A purchase transaction may include a user providing electronic payment information, providing identification information, clicking or otherwise actuating a purchasing button, etc. At 132 the method includes receiving the purchase transaction request for the product from the client program at the electronic commerce server. At 134 the method includes sending a message from the electronic commerce server to the test server reporting the session identifier and the completion of the purchase transaction. The purchase transaction may be completed when a user's electronic payment information has been verified, for example. Next at 136 the method includes receiving the message reporting the session identifier and the completion of the purchase transaction from the electronic commerce server at the test server. In this way, the performance of the content version may be gauged via the test server through completion or non-completion of a purchase transaction.

Method 100 enables the electronic commerce server to act as a browser program to obtain session and variant identifiers which the electronic commerce platform may then used to modify web page content slated to be provided to a browser program executed on a client device. In this way, dynamic content may be varied for statistical testing purposes.

Prior to implementation of method 100 the test server 54 and the electronic commerce server 52 may engage in a setup phase, and communicate to set up a variant test and establish various testing parameters. For example, the electronic commerce server 52 may request campaigns and variants from the test server 52. Next the test server may return campaigns and variants in response to the request. Next, the electronic commerce server and the test server may be synchronized. Synchronization may include the exchange of testing data. Next, a user of the electronic commerce server may create a dynamic test such as a price test and create the rules that determine which dynamic content data (e.g., price) is shown on a per variant basis. Additionally, the user may also create a new variant value via the electronic commerce system. Subsequently the electronic commerce system may send an update to the test server indicating the creation of the dynamic test and/or the new variant value. After the update synchronization of the electronic commerce server and test server may occur once more. Following the setup phase, the method 100 described above may be implemented in an implementation phase.

Figure 4:
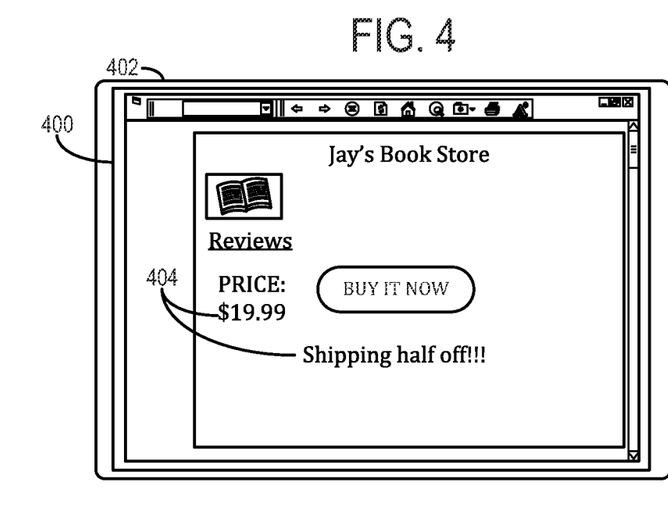
Figure 5:
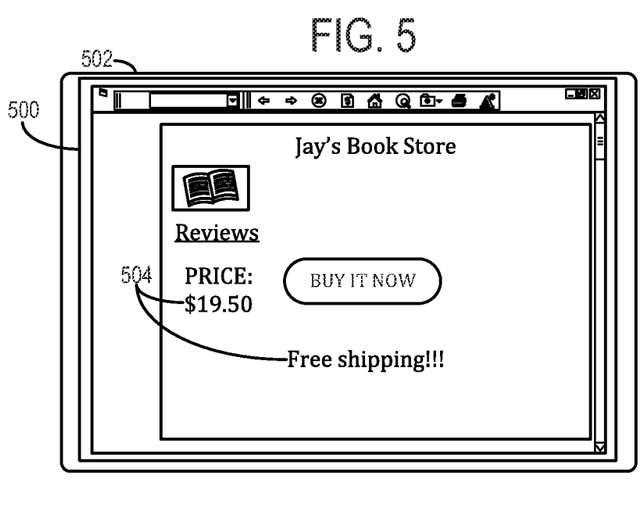

FIGS. 4-5 show exemplary dynamic content variations that may be implemented as part of a split test and presented in a GUI. FIG. 4 shows a GUI 400 presented on a display 402. The GUI 400 is associated with a first client program executed on a first client device. Likewise FIG. 5 shows a GUI 500 presented on a display 502. The GUI 500 is associated with a second client program executed on a second client device. It will be appreciated that client devices and client applications associated with FIGS. 4 and 5 may be similar to client program 50. As shown the dynamic content (404 and 504) presented on GUIs 400 and 500 be adjusted via an electronic commerce platform based on the version of the content assigned to the particular client program. In this way, the testing parameters may be expanded enabling the test server 54 to perform more extensive market testing which may provide a business with a greater amount of feedback with regard to a web page or website.

The above described methods and processes may be executed by a system 600 for electronic commerce testing and management, as shown in FIG. 6. As discussed above the system may include the electronic commerce server 52 and the test server 54, each configured to perform their corresponding method steps described above. The system 600 may additionally include a client device 602 configured to execute the client program 50. The client program may be a browsing program such as a web browser. Exemplary web browsers may include FIREFOX®, MICROSOFT INTERNET EXPLORER®, SAFARI®, etc.

The electronic commerce server 52 may be configured to manage various aspects of website development for an online retailer or other business providing goods and/or services via a website.

The test server 54 may among other things be configured to implement a split test and/or a multi-variate test based variant testing model, as discussed above. Example test servers may include but are not limited to: ABTESTS.COM, ADOBE® TEST AND TARGET, GOOGLE® WEBSITE OPTIMIZER®, LAZZIA, LIVEBALL®, OPTIMIZELY, PERFORMABLE®, UNBOUNCE®, VISUAL WEBSITE OPTIMIZER, VITES, and SUMOOPTIMIZE.

It will be appreciated that the client program 50, the electronic commerce server 52, and the test server 54 may use wired and/or wireless methods of communication to interact via a suitable network 601 such as the Internet. Furthermore, the electronic commerce server 52, the test server 54, and/or the client device 602 may be remotely located.

The client device 602 may include a display 604. The client device 602 may further include memory 606 executable by a processor 608. The electronic commerce server 52 and test server 54 may also include memory, 610 and 612 respectively, executable via a processor, 614 and 616 respectively.

Each of the processors (608, 614, and 616) may include one or more physical devices configured to execute one or more instructions. For example, each of the processors may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The processors may be configured to execute software instructions. Additionally or alternatively, the processors may include one or more hardware or firmware logic machines configured to execute hardware or firmware instructions. It will be appreciated that each of the processors (608, 614, and 616) may be differently configured, according to the needs of each device.

The memory (606, 610, and 612) included in each of the client device 602, electronic commerce server 52, and test server 54 may each include one or more physical devices configured to hold data and/or instructions executable by the processor to implement the herein described methods and processes. When such methods and processes are implemented, the state of memory may be transformed (e.g., to hold different data). The memory (606, 610, and 612) may include removable media and/or built-in devices. The memory (606, 610, and 612) may include optical memory devices, semiconductor memory devices, and/or magnetic memory devices, among others. The memory (606, 610, and 612) may include devices with one or more of the following characteristics: volatile, nonvolatile, dynamic, static, read/write, read-only, random access, sequential access, location addressable, file addressable, and content addressable. It will be appreciated that each memory (606, 610, and 612) may be differently configured, according to the needs of each device.

In some embodiments, the processor and memory corresponding to the client device 602, electronic commerce server 52, and/or test server 54 may be integrated into one or more common devices, such as an application specific integrated circuit or a system on a chip. Additionally, the display 604 may be used to present a visual representation of data held by memory 606. Likewise processor 608 and memory 606 included in the test server may be integrated into one or more common devices. Additionally, processor 614 and memory 610 included in the electronic commerce server may be integrated into one or more common devices.

Although the test server 54 and electronic commerce server 52 are described with regard to a single server it will be appreciated that the method and processes describe above with regard to the test and electronic commerce servers may be implemented on a plurality of servers. That is to say that the test server and/or electronic commerce server may be server clusters. In some examples, the servers in the server cluster may be positioned within a single facility. However, in other examples, the servers in the server cluster may be remotely located.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for electronic commerce testing and management comprising: an electronic commerce server having code executed by a processor of the electronic commerce server to:
   receive a request from a client program executed on a client device for web page data featuring a product for sale at the electronic commerce server;
   emulate a client browser, including sending a request to a separate test server to be assigned a session identifier and associated content version, the content version being one of a plurality of content versions in a variant testing model implemented by the test server; and receiving the session identifier from the test server;
   generate web page data to send to the client program, including: (1) generating computer code that upon execution causes the client program to request the assigned content version of static content from the test server using the session identifier, and (2) using the session identifier to generate dynamic web page content with the electronic commerce server including pricing data and item shipping data based on one or more dynamic content factors including the assigned content version, a location of the client device, and a browsing history of the client program via the electronic commerce server;
   send the web page data to the client program, the web page data including dynamic web page content for display by the client program and executable computer code causing the client program to request the static content associated with the assigned content version from the test server, in turn causing the test server to generate and
   send the assigned content version of the static content to the client program; and
   upon receipt of a purchase transaction request from the client program at the electronic commerce server, report completion of the purchase transaction request to the test server.

2. The system of claim 1, wherein the electronic commerce server further includes code executable by the processor to send a request for an assigned content version identifier to the test server and receive the assigned content version identifier from the test server.

3. The system of claim 2, wherein the dynamic content factors include an identifier of the assigned content version.

4. The system of claim 1, wherein the electronic commerce server further includes code executable by the processor to receive a request from the client program for a purchase transaction for the product at the electronic commerce server.

5. The system of claim 1, wherein the electronic commerce server further includes code executable by the processor to send a message from the electronic commerce server to the test server reporting the session identifier and the completion of the purchase transaction.

6. The system of claim 1, wherein the static content includes text, images, objects, videos, animations, HTML, audio content, and cascading style sheets.

7. The system of claim 1, wherein the computer code is runtime executable code that is executed in a runtime environment provided by the client program.

8. The system of claim 1, wherein the computer code further instructs the client program to store the session identifier in a cookie on a client device executing the client program.

9. The system of claim 1, wherein the test server is configured to implement a split test and/or a multi-variate test based variant testing model.

10. A method for electronic commerce management comprising:
   receiving a request from a client program executed on a client device for web page data featuring a product on sale at an electronic commerce server;
   emulating a client browser, including sending a request from the electronic commerce server to a separate test server to be assigned a session identifier and associated content version, the content version being one of a plurality of content versions in a variant testing model implemented by the test server; and receiving the session identifier from the test server at the electronic commerce server;
   sending a request for an assigned content version identifier from the electronic commerce server to the test server;

receiving the assigned content version identifier at the electronic commerce server from the test server;

generating, with the electronic commerce server, web page data to send to the client program, including: (1) generating computer code that upon execution causes the client program to request the assigned content version of static content from the test server using the session identifier, and (2) using the session identifier to generate dynamic web page content including pricing data and/or item shipping data-based on one or more dynamic content factors, the dynamic content factors including the assigned content version identifier, a location of the client device, and a browsing history of the client program via the electronic commerce server;

sending the web page data to the client program, the web page data including dynamic web page content for display by the client program and executable computer code causing the client program to request the static content associated with the assigned content version from the test server, in turn causing the test server to generate and send the assigned content version of the static content from the test server to the client program; and upon receipt of a purchase transaction request from the client program at the electronic commerce server, reporting completion of the purchase transaction request to the test server.

11. The method of claim 10, further comprising receiving a request from the client program for a purchase transaction for the product at the electronic commerce server and sending a message from the electronic commerce server to the test server reporting the session identifier and the completion of the purchase transaction.

12. The method of claim 10, wherein the static content includes text, images, objects, videos, animations, HTML, audio content, and cascading style sheets.

13. A method for electronic commerce management comprising:

receiving a request from a client program executed on a client device for web page data featuring a product on sale at an electronic commerce server;

emulating a client browser, including sending a request from the electronic commerce server to a separate test server to be assigned a session identifier and associated content version, the content version being one of a plurality of content versions in a variant testing model implemented by the test server; and receiving the session identifier from the test server at the electronic commerce server;

generating, at the electronic commerce server, web page data to send to the client program, including: (1) generating computer code that upon execution causes the client program to request the assigned content version of static content from the test server using the session identifier, and (2) using the session identifier to generate dynamic web page content including pricing data and/or item shipping data based on one or more dynamic content factors including the assigned content version identifier, a location of the client device, and a browsing history of the client program via the electronic commerce server;

sending the web page data from the electronic commerce server to the client program, the web page data including dynamic web page content for display by the client program and executable computer code causing the client program to request static content associated with the assigned content version from the test server, in turn causing the test server to generate and send the assigned content version of the static content from the test server to the client program;

receive a request at the electronic commerce server from the client program for a purchase transaction for the product at the electronic commerce server; and send a message from the electronic commerce server to the test server reporting the session identifier and the completion of the purchase transaction.

14. The method of claim 13, further comprising prior to generating the web page data, sending a request for an assigned content version identifier to the test server and receiving the assigned content version identifier from the test server.

15. The method of claim 13, wherein the dynamic web page content includes pricing data and/or item shipping data.

* * * * *